United States Patent [19]

Anezaki

[11] Patent Number: 5,257,371

[45] Date of Patent: Oct. 26, 1993

[54] SYSTEM PACKAGING OBJECT CLASS DEFINING INFORMATION

[75] Inventor: Akihiro Anezaki, Tokyo, Japan

[73] Assignee: NEC Corporation, Tokyo, Japan

[21] Appl. No.: 650,575

[22] Filed: Feb. 6, 1991

[30] Foreign Application Priority Data

Feb. 6, 1990 [JP] Japan .................................. 2-28106

[51] Int. Cl.⁵ .............................................. G06F 9/44
[52] U.S. Cl. ................................... 395/650; 395/700;
364/DIG. 1; 364/280
[58] Field of Search ................. 395/600, 700, 27, 24,
395/575, 250, 800, 425, 50, 76, 500, 650;
364/550, 514, 715.11; 382/14; 235/455;
371/40.1

[56] References Cited

U.S. PATENT DOCUMENTS

| | | | |
|---|---|---|---|
| 4,843,575 | 6/1989 | Crane | 364/550 |
| 5,043,869 | 8/1991 | Suzuki et al. | 364/200 |
| 5,058,185 | 10/1991 | Morris et al. | 382/41 |

OTHER PUBLICATIONS

"Information processing systems-Open Systems Interconnection-Basic Reference Model-Part 4: Management Framework", International Standards ISO/IEC 7498-4:1989, pp. 1-9.

Primary Examiner—Kevin A. Kriess
Assistant Examiner—Kevin Spivak
Attorney, Agent, or Firm—Foley & Lardner

[57] ABSTRACT

In a network management system installing object class defining information, the benefits of altering object class definitions and responding to real time instance generation requests are both available. The system includes a first region for storing object class definitions, a second region for storing instances of the class for which generation is requested and a third region for storing a class information table for updating. The contents of the third region are generated or updated by batch processing on the basis of the first region. Real time processing means generates or updates the contents of the second region on the basis of the contents of the third region.

7 Claims, 8 Drawing Sheets

| OBJECT CLASS IDENTIFIER | VALUES OF THE CHARACTERISTICS |
|---|---|
| ITEM 51 — (mOBJECT CLASS 1) | CHARACTERISTIC a, CHARACTERISTIC b |
| 52 — (mOBJECT CLASS 2) | CHARACTERISTIC a, CHARACTERISTIC b, CHARACTERISTIC x1, CHARACTERISTIC x2 |
| 53 — (mOBJECT CLASS 3) | CHARACTERISTIC a, CHARACTERISTIC b, CHARACTERISTIC Y1, CHARACTERISTIC Y2 |
| 54 — (mOBJECT CLASS 4) | CHARACTERISTIC a, CHARACTERISTIC b, CHARACTERISTIC Z1, CHARACTERISTIC Z2 |
| 55 — (mOBJECT CLASS 5) | CHARACTERISTIC a, CHARACTERISTIC b, CHARACTERISTIC x1, CHARACTERISTIC x2, CHARACTERISTIC xx1, CHARACTERISTIC xx2. |

SYSTEM PACKAGING OBJECT CLASS DEFINING INFORMATION

The present invention relates to a system for installing object class defining information for use in a network management system for, and more particularly to a system installing object class defining information for, where an open systems interconnection (OSI) management model is used as the network management system, the managed objects designed by that object-oriented model.

BACKGROUND OF THE INVENTION

In a system for installing object class defining information according to the prior art, either one of the following two installing methods were used.

The first method, as in the C++ language developed by the AT&T Bell Laboratories of the U.S. as an extension of the C language and realized as a C source generating preprocessor, is to staticly take in characteristics to be inherited for the class in which instances are generated at the time of developing a program such as compile or link. Objects sharing a sequence of operations are regarded as belonging to the same class, and a specific object is refered to as an instance of the class.

This first method is too static to take advantage of the class definition by the object-oriented model in operation, but this advantage is limited to definition. Thus, a change in superclass definition makes it necessary for all subclass definitions to be compiled or linked anew. Moreover, there is the disadvantage that neither compiling nor linking is possible during the operation of network management.

The second method is a method of dynamically deferring, as in a small talk language, to characteristics to be inherited from subclass definition to superclass definition every time an instance is accessed. This method, however, is too dynamic for its performance to permit practical use. Since the possibility for class definition to take place during the operation of network management is very remote, this second method has the disadvantage of excessive redundancy.

An object of the present invention is to provide a system for installing object class defining information free of the above stated disadvantages, making it possible to change object class definitions during the operation of network management and capable of meeting a request for real-time instance generation.

SUMMARY OF THE INVENTION

According to one aspect of the invention, there is provided a system which is provided with a first region for storing a plurality of object class definitions concerning the objects of management operated according to OSI management protocols, a second region for storing instances of the class for which generation is requested, and a third region for storing a class information table for updating use, having characteristics of one class including characteristics inherited in each class; batch processing means for generating or updating the contents of the third region by batch processing on the basis of the contents of the first region; and real-time processing means for generating or updating the contents of the second region by real-time processing on the basis of the contents of the third region.

In a system according to another aspect of the invention, the batch processing means can include a fourth region for storing an object class inheritance tree, inheritance tree generating/updating means for generating or updating the contents of the fourth region on the basis of the contents of the first region, and third region generating/updating means for generating or updating the contents of the third region on the basis of the contents of the fourth region; and the real-time processing means can include a fifth region for storing a class information table having characteristics of one class including characteristics inherited in each class, fifth region generating/updating means for generating or updating the contents of the fifth region on the basis of the contents of the third region, instance generating means for generating or updating the contents of the second region with reference to the contents of the fifth region, a lock semaphore for performing exclusive control to avoid contention between the generation or updating of and reference to the fifth region by the fifth region generating/updating means and the instance generating means, respectively, and lock semaphore access means capable of accessing the lock semaphore, actuated by the fifth region generating/updating means or the instance generating means.

The third region is provided to store a class information table having characteristics of one class including characteristics inherited in each class. The batch processing means generates or updates the contents of the third region by batch processing on the basis of the contents of the first region. The real-time processing means generates or updates the contents of the second region by real-time processing on the basis of the contents of the third region.

The fourth region is provided to store an object inheritance tree. The inheritance tree generating/updating means generates or updates the contents of the fourth region on the basis of the contents of the first region, and the third region generating/updating means generates or updates the contents of the third region on the basis of the contents of the fourth region, both by batch processing. The fifth region is provided to store a class information table having characteristics of one class including characteristics inherited in each class. The fifth region generating/updating means generates or updates the contents of the fifth region on the basis of the contents of the third region; the instance generating means generates or updates the contents of the second region with reference to the contents of the fifth region; the lock semaphore access means accesses the lock semaphore, actuated by the class information table generating/updating means or the instance generating means; and the lock semaphore can perform exclusive control to avoid contention between the generation or updating of and reference to the fifth region by the fifth region generating/updating means and the instance generating means, respectively, all by real-time processing.

The operations stated above make it possible to change object definitions during the operation of network management and to comply with a request for instance generation on a real-time basis.

BRIEF DESCRIPTION OF THE DRAWINGS

The above-mentioned and other objects, features and advantages of the present invention will be better understood from the following detailed description of a preferred embodiment of the invention when taken in conjunction with the accompanying drawings, wherein.

PREFERRED EMBODIMENT OF THE INVENTION

Figure 1:
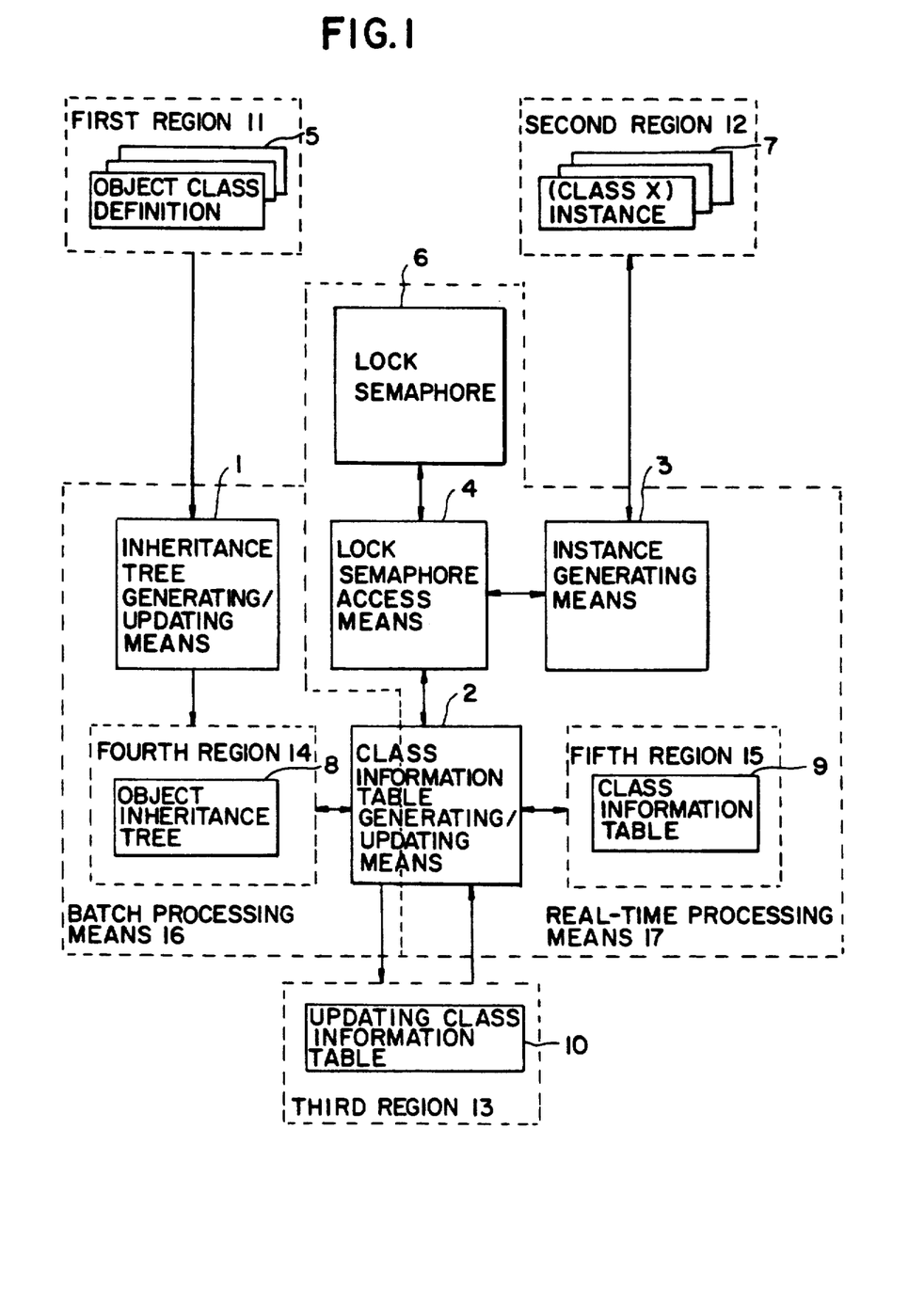
FIG. 1 illustrates the configuration of one preferred embodiment of the invention.

Referring to FIG. 1, a system including object class defining information, which is a preferred embodiment of the present invention, is provided with a first region 11 for storing a plurality of object class definitions 5 concerning the objects of management operated according to OSI management protocols and a second region 12 for storing instances of the class for which generation is requested.

A characteristic feature of the invention is that the system is further provided with a third region 13 for storing an updating class information table 10, having characteristics of one class including characteristics inherited in each class; batch processing means 16 for generating or updating the contents of the third region 13 by batch processing on the basis of the contents of the first region 11; and real-time processing means 17 for generating or updating the contents of the second region 12 by real-time processing on the basis of the contents of the third region 13.

Figure 3:
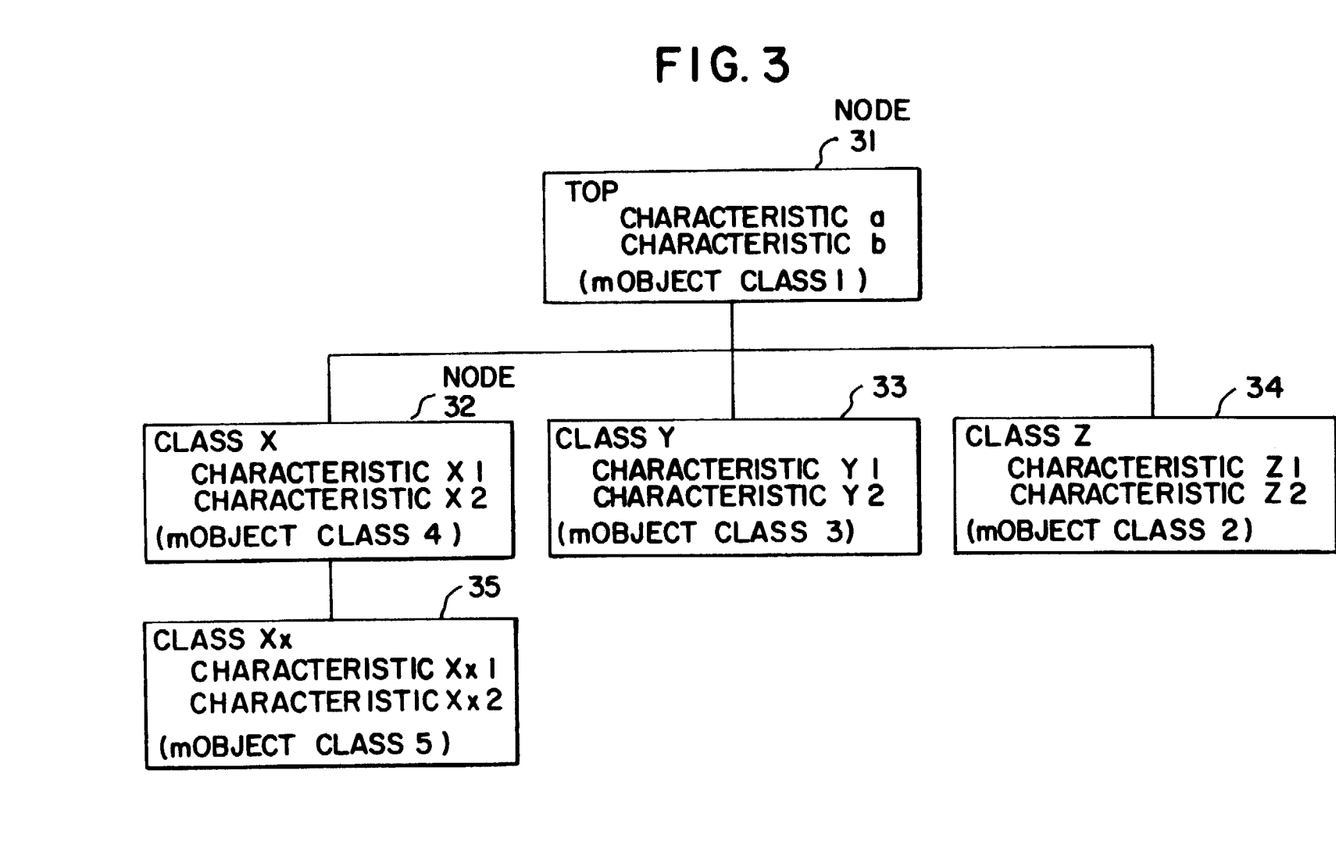
FIG. 3 illustrates the logical configuration of the inheritance tree of objects used in the preferred embodiment of the invention.

The batch processing means 16 includes a fourth region 14 for storing an object inheritance tree 8, as shown in FIG. 3 for example, inheritance tree generating/updating means 1 for generating or updating the contents of the fourth region 14 on the basis of the contents of the first region 11, and part of class information table generating/updating means 2 as third region generating/updating means for generating or updating the contents of the third region 13 on the basis of the contents of the fourth region 14. The real-time processing means 17 includes a fifth region 15 for storing a class information table 9 having characteristics of one class including characteristics inherited in each class, part of the class information table generating/updating means 2 as fifth region generating/updating means for generating or updating the contents of the fifth region 15 on the basis of the contents of the third region 13, instance generating means 3 for generating or updating the contents of the second region 12 with reference to the contents of the fifth region 15, a lock semaphore 6 for performing exclusive control to avoid contention between the generation or updating of and reference to the fifth region 15 by the class information table generating/updating means 2 and the instance generating means 3, respectively, and lock semaphore access means 4 for accessing the lock semaphore 6, actuated by the class information table generating/updating means 2 or the instance generating means 3.

Now will be described in detail the operations of the system for packaging object class defining information, which is a preferred embodiment of the present invention, with reference to drawings.

Referring to FIG. 1, the inheritance tree generating/updating means 1 is a means to generate or update an object inheritance tree obtained by linking a plurality of object class definitions so as to facilitate a search for characteristics to be inherited by the plurality of object class definitions 5.

Figure 2:
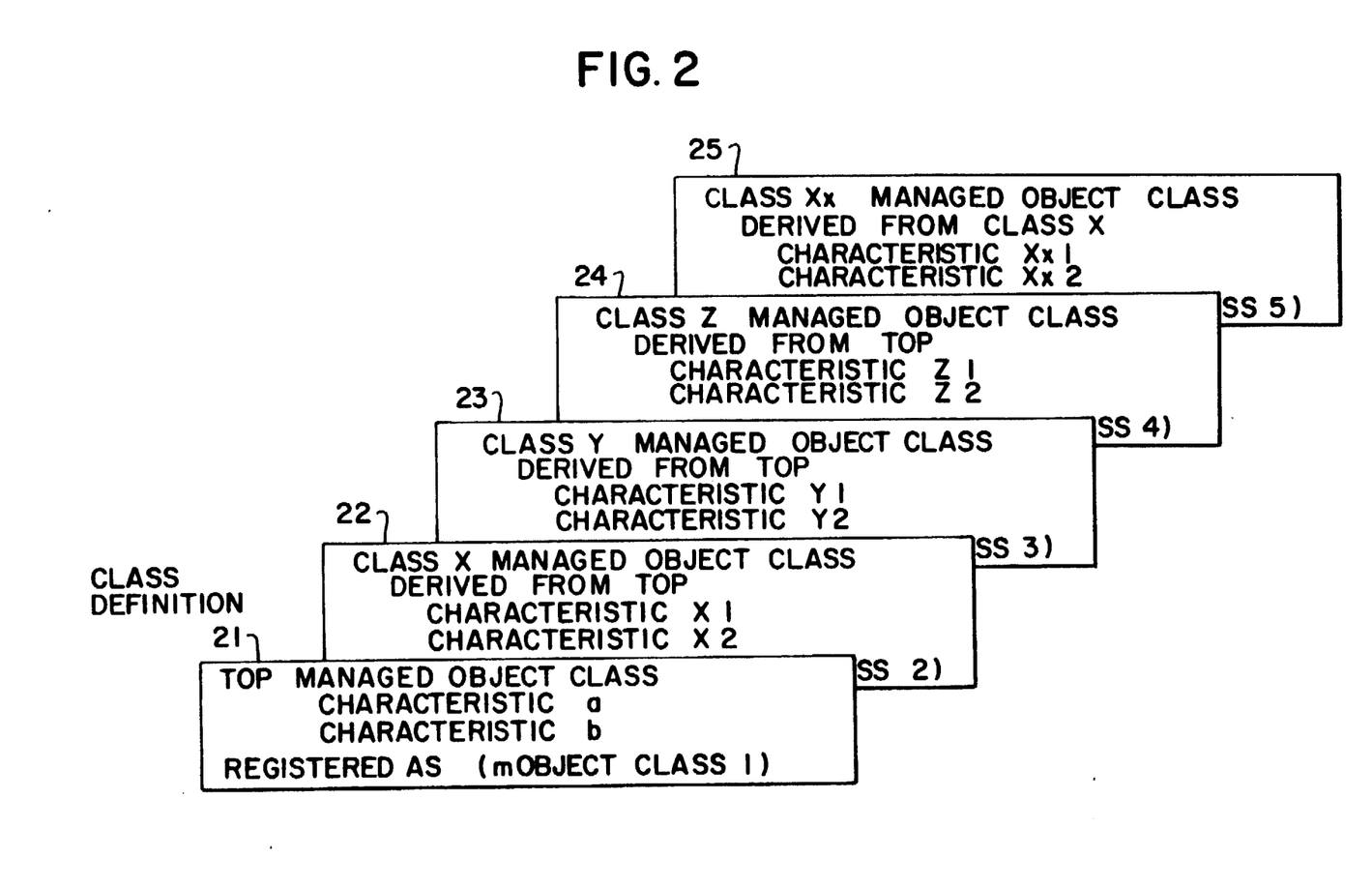
FIG. 2 illustrates an example of the object class definitions 5 shown in FIG. 1.

The operations of this inheritance tree generating/updating means 1 will be described in detail with reference to FIG. 2 illustrating an example of the plurality of object class definitions 5 and FIG. 3 illustrating an example of the object inheritance tree 8.

Referring to FIG. 2, a top class definition 21, because of a absence of the "DERIVED FROM" statement which designates a superclass, is a class definition positioned at a node 31 at the root of the object inheritance tree. Other class definitions 22 to 25 are subclasses of a superclass designated by the "DERIVED FROM" statement, which represents the inheritance of the characteristics of the superclass. The inheritance tree generating/updating means 1 generates parent-child relations of the tree structure shown in FIG. 3 from the relations between the superclass and its subclasses. Thus, class X is a subclass of the top class, positioned at node 32. Class Y is another subclass of the top class, positioned at node 33. Class Z is still another subclass of the top class, positioned at node 34. Class Xx is a subclass of class X, positioned at a node 35.

The class information table generating/updating means 2 is means to generate the class information table 9 from the object inheritance tree 8 while using the lock semaphore access means 4.

The operations of the class information table generating/updating means 2 will now be described in detail with reference to FIGS. 4 to 7.

Figure 5:
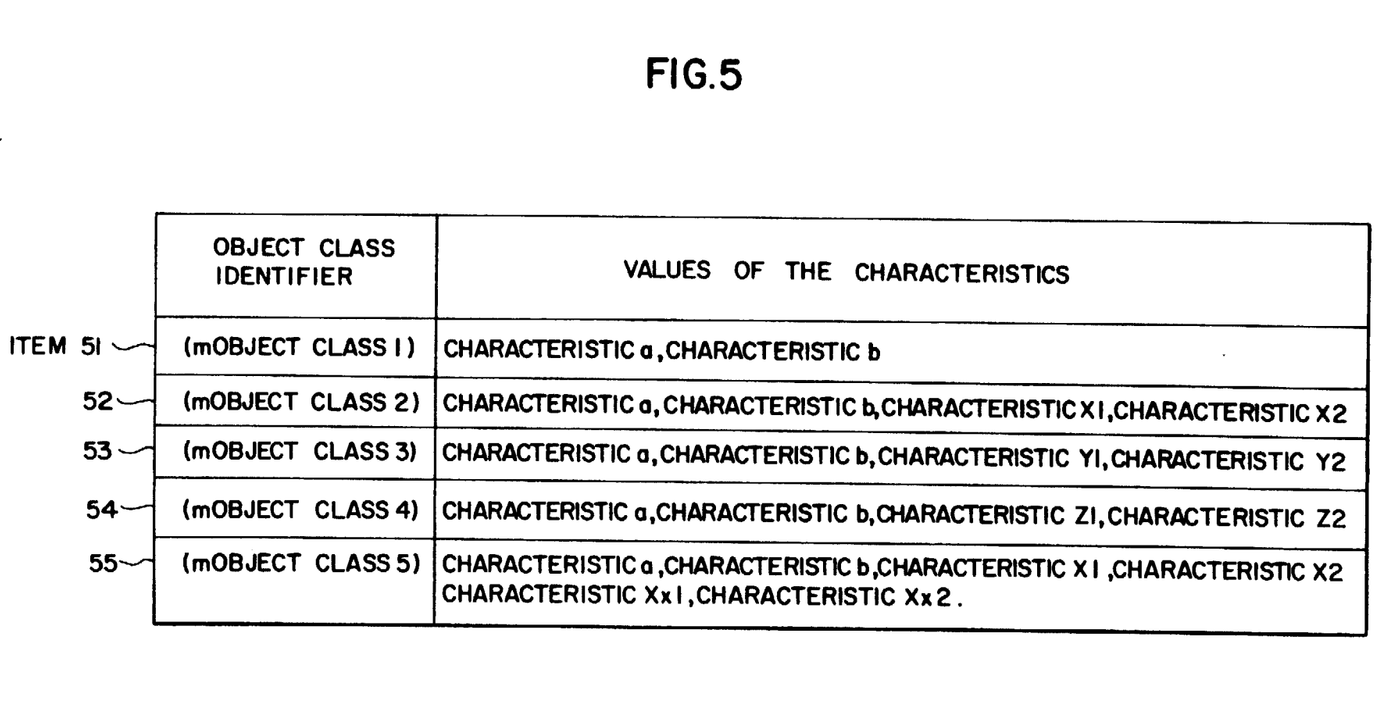
FIG. 5 illustrates an example of the class information table 9 and the updating class information table 10 shown in FIG. 1.
Figure 6:
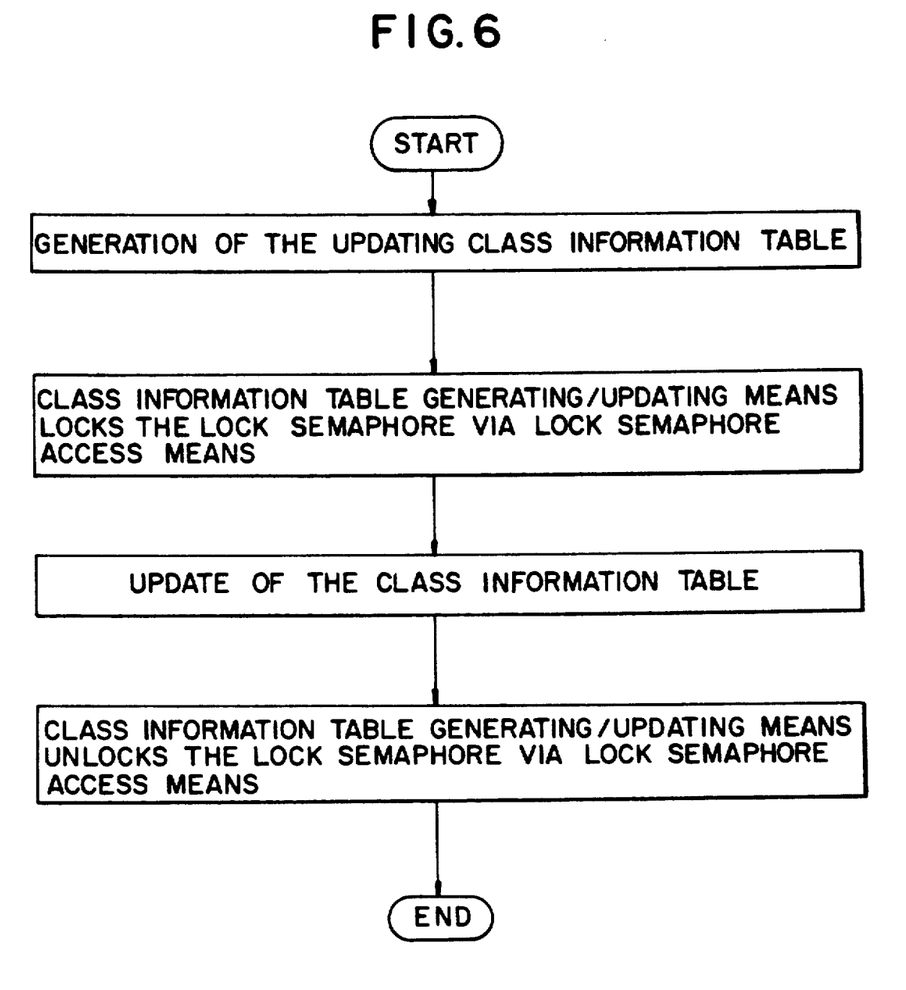
FIG. 6 is a flow chart for describing the operation of the class information table generating/updating means 2 shown in FIG. 1.

Referring to FIGS. 1 and 6 together, the class information table generating/updating means 2 first performs the processing shown in FIG. 6 at step S61, and generates the updating class information table 10 shown in FIG. 5. In order to update the class information table 9 with its updating information, the class information table generating/updating means 2 locks the lock semaphore 6 at step S62, and performs exclusive control of the instance generating means 3. After the means 2 has updated the class information table 9 at step S63, the means 2 unlocks the lock semaphore 6 at step S64.

Next will be described in detail the processing to generate a class information table for updating use with reference to FIG. 7. It being assumed that the class information table 9 shown in FIG. 1 is to be newly generated, the physical configuration of the object inheritance tree shown in FIG. 4 will be regarded as the updating class information table 10 shown in FIG. 1.

Figure 4:
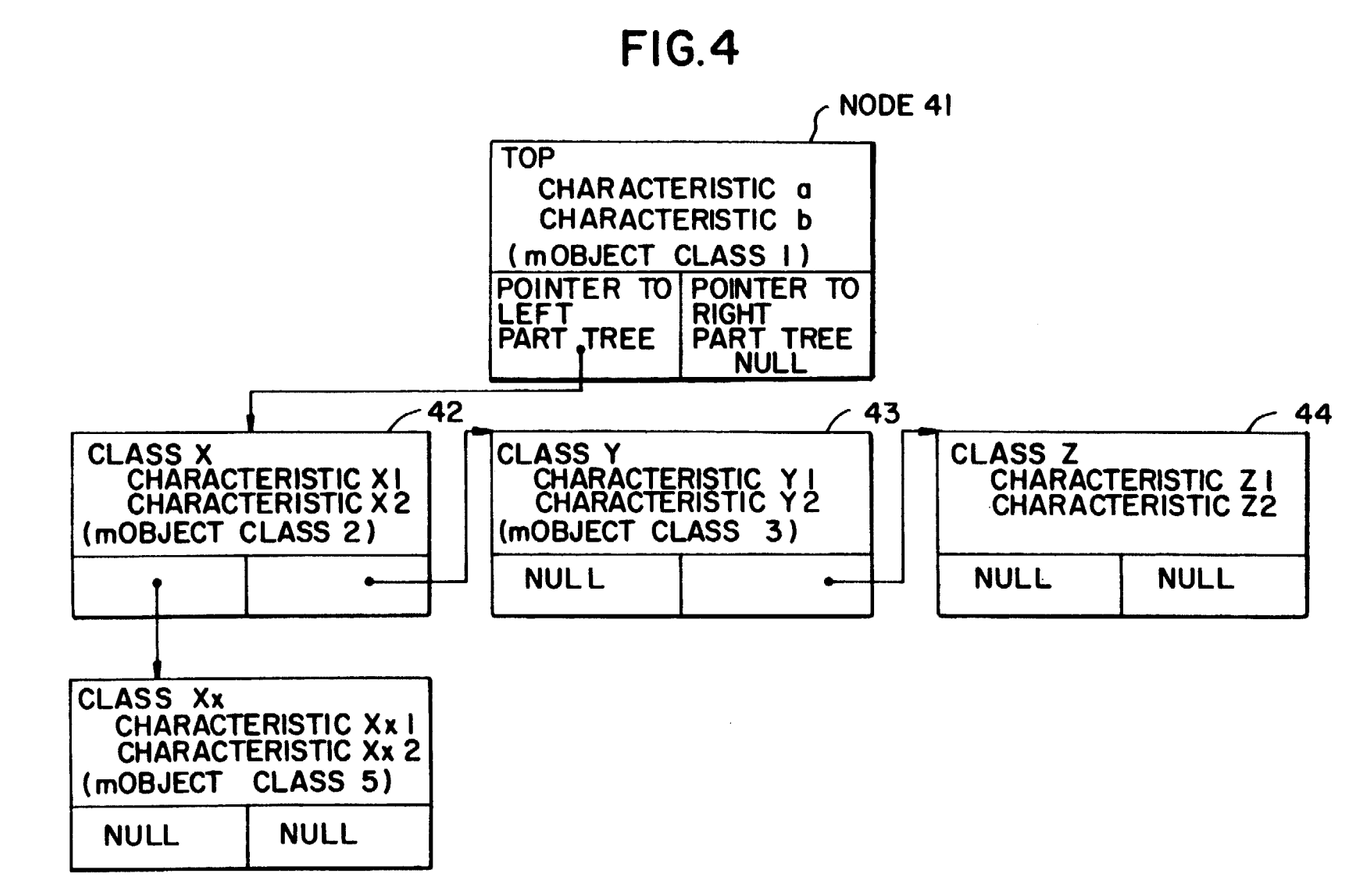
FIG. 4 illustrates the physical configuration of the inheritance tree of objects used in the preferred embodiment of the invention.
Figure 7:
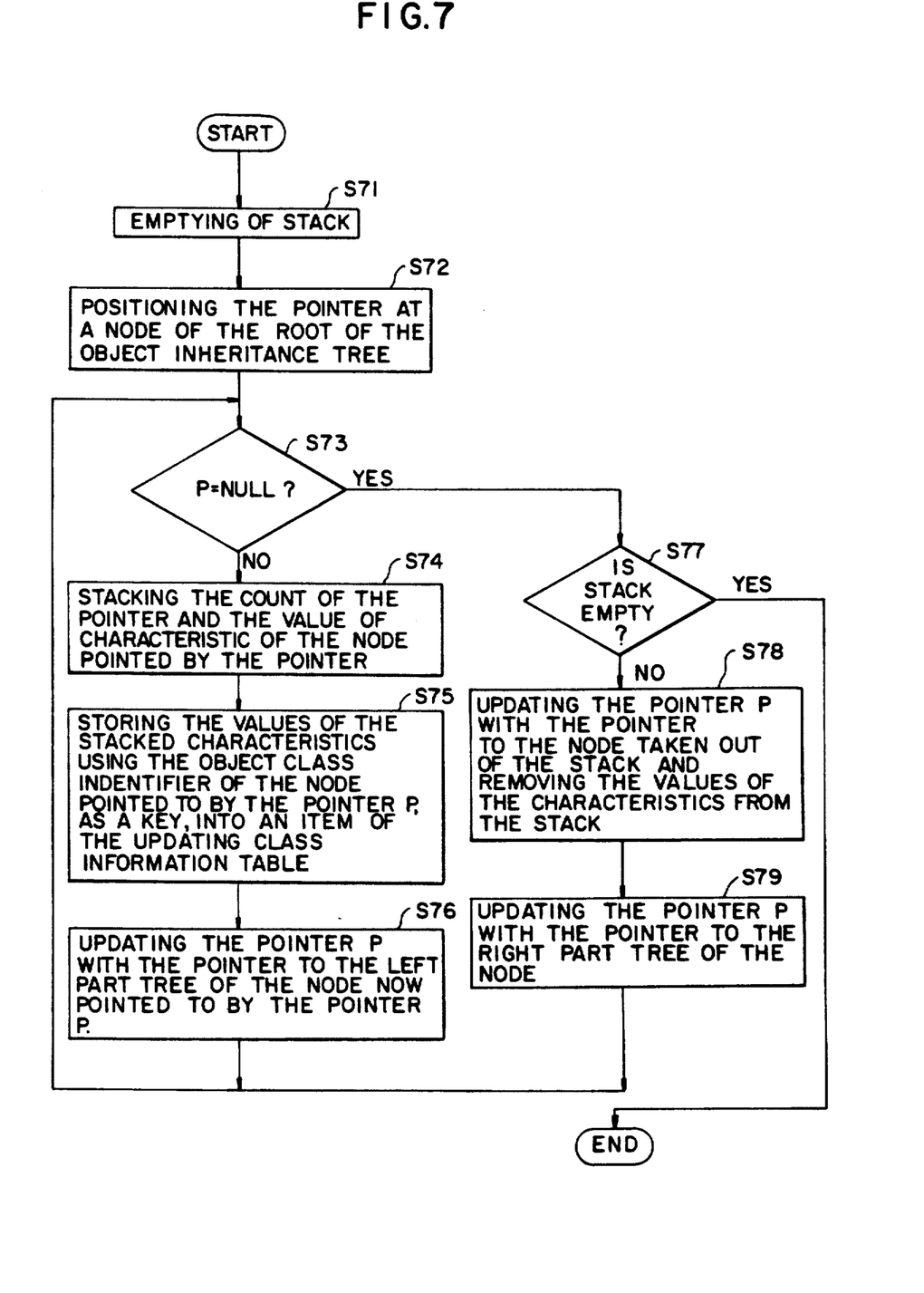
FIG. 7 is a flow chart for describing the operation to generate the class information table for updating use by the class information table generating/updating means 2 shown in FIG. 1.

Referring now to FIGS. 4, 5 and 7, after having emptied the stack (reducing the stack pointer to "0"), the class information table generating/updating means 2 positions the pointer P at a node 41 of the root of the object inheritance tree shown in FIG. 4 at step S72. Judging that the pointer P is not null at step S73, the means 2 moves on to step S74, and stacks the count of the pointer P, pointing to the node 41, and the values of characteristics a and b. This operation brings the count of the stack pointer to "1". The updating means 2, at step S75, stores in item 51 of the updating class information table 10, shown in FIG. 5, the values of the stacked characteristics a and b using the object class identifier of the node 41 (m Object Class 1), pointed to by the pointer P, as the key. The updating means 2, at step S76, updates the pointer P with the pointer to the left part tree (node 42) of the node 41 now pointed to by the pointer P, and at step S73 judges whether or not the pointer P is null. The class information table generating-/updating means 2, judging that the pointer P is not null at step S73, moves on to step S74, where the count of the pointer P pointing to the node 42 and the values of characteristics X1 and X2 are stacked. This operation brings the count of the stack point to "2". The class information table generating/updating means 2, at step S75, stores item 52 of the updating class information table 10, shown in FIG. 5, the values of the stacked characteristics a, b, X1 and X2 using the object class identifier of the node 42 (m Object Class 2), pointed to by the pointer P, as the key. Then the class information table generating/updating means 2, at step S76, updates the pointer P with the pointer to the left part tree (node 45) of the node 42 now pointed to by the pointer P, and at step S73 judges whether or not the pointer P is null.

The class information table generating/updating means 2, judging that the pointer P is not null at step S73, moves on to step S74, where the count of the pointer P pointing to the node 45 and the values of characteristics Xx1 and Xx2 are stacked. This operation brings the count of the stack point to "3". The class information table generating/updating means 2, at step S75, stores into an item 55 of the updating class information table 10, shown in FIG. 5, the values of the stacked characteristics a, b, X1, X2, Xx1 and Xx2 using the object class identifier of the node 45 (m Object Class 5), pointed to by the pointer P, as the key. The class information table generating/updating means 2, at step S76, updates the pointer P with the pointer to the left part tree of the node 45 now pointed to by the pointer P, and at step S73 judges whether or not the pointer P is null.

The class information table generating/updating means 2, judging that the pointer P is not null at step S73, moves on to step S77, where it judges whether the stack is empty or not.

The means 2, as the stack pointer's count is "3" at step S77, updates at step S78 the pointer P with the pointer to the node 45 taken out of the stack and, at the same time, removes the values of the characteristics Xx1 and Xx2 from the stack. Then the stack pointer takes a count of "2". Then the means 2, at step S79, updates the pointer P with the pointer to the right part tree of the node 45, and judges at step S73 whether the right part tree of the node 45 is null or not. The means 2, judging that the right part tree of the node 45 is null, judges at step S77 whether the stack is null or not. The means 2, as the stack pointer's count is "2", updates at step S78 the pointer P with the pointer to the node 42 taken out of the stack and, at the same time, removes the values of the characteristics X1 and X2 from the stack. Then the stack pointer takes a count of "1". Then the means 2, at step S79, updates the pointer P with the pointer to the right part tree of the node 42, i.e. the pointer to the node 43, and judges at step S73 whether the pointer to the node 43 is null or not. The means 2, judging at step 73 that the pointer P is not null, stacks at step S74 the count of the pointer P and the values of characteristics Y1 and Y2. Then the stack pointer takes a count of "2". The means 2, at step S75, stores into an item 53 of the updating class information table 10 the values of the stacked characteristics a, b, Y1 and Y2 using the object class identifier of the node 43 (m Object Class 3), pointed to by the pointer P, as the key, and at step S76 updates the pointer P with the pointer to the left part tree of the node 43 now pointed to by the pointer P. Then the means 2 judges whether or not the pointer P to the left part tree of the node 43 is null and, as the pointer P is judged null, judges at step S77 whether the stack is empty or not. The means 2, as the stack pointer's count is "2", updates at step S78 the pointer P with the pointer to the node 43 taken out of the stack and, at the same time, takes out the values of the characteristics Y1 and Y2 from the stack. Then the stack pointer gives a count of "1". Then the means 2, at step S79, updates the pointer P from the pointer to the right part tree of the node 43 to that to the node 44, and judges at step S73 whether the updated pointer is null or not. The means 2, judging that the pointer is not null at step 73, stacks at step S74 the count of the pointer P pointing to the node 44 and the values of characteristics Z1 and Z2. At this time, the stack pointer takes a count of "2". The means 2, at step S75, stores into an item 54 of the updating class information table 10, showing in FIG. 5, the values of the stacked characteristics a, b, Z1 and Z2 using the object class identifier of the node 44 (m Object Class 4), pointed to by the pointer P, as the key. The table generating/updating means 2 at step S76 updates the pointer P with the pointer to the left part tree of the node 44 now pointed to by the pointer P, and at step S73 judges whether or not the pointer P to the left part tree of the node 44 is null. As the pointer is judged null at step S73, the updating means 2 judges at step S77 whether the stack is empty or not. The updating means 2, as the stack pointer's count is "2", updates at step S78 the pointer P with the pointer to the node 44 taken out of the stack, removes the values of the characteristics Z1 and Z2 from the stack, and at step S79 updates the pointer P with the pointer to the right part tree of the node 44. Then the updating means 2 judges at step S73 whether the updated pointer is null or not, and as it is judged null, judges at step S77 whether or not the stack is empty. As the stack pointer takes a count of "2", the updating means 2 updates at step S78 the pointer P with the pointer to the node 44 taken out of the stack, removes the characteristics Z1 and Z2 from the stack, and at step S79 updates the pointer P with the pointer to the right part tree of the node 44. As the updated pointer to the right part tree of the node 44 is judged null at step S73, the updating means 2 judges at step S77 whether the stack is empty or not. The updating means 2, as the stack pointer's count is "1", judges at step S77 that the stack is not empty, updates at step S78 the pointer P with the pointer to the node 41 taken out of the stack, and removes the characteristics a and b from the stack. At this time the stack pointer takes a count of "0". The updating means 2 at step S79 updates the pointer P with the pointer to the right part tree of the node 41, and judges at step S73 whether the updated pointer to the right part tree of the node 41 is null or not. The updating means 2, as the pointer to the right part tree of the node 41 is judged null, judges at step S77 whether or not the stack is empty. As the stack pointer takes a count of "0", the processing ends here.

Figure 8:
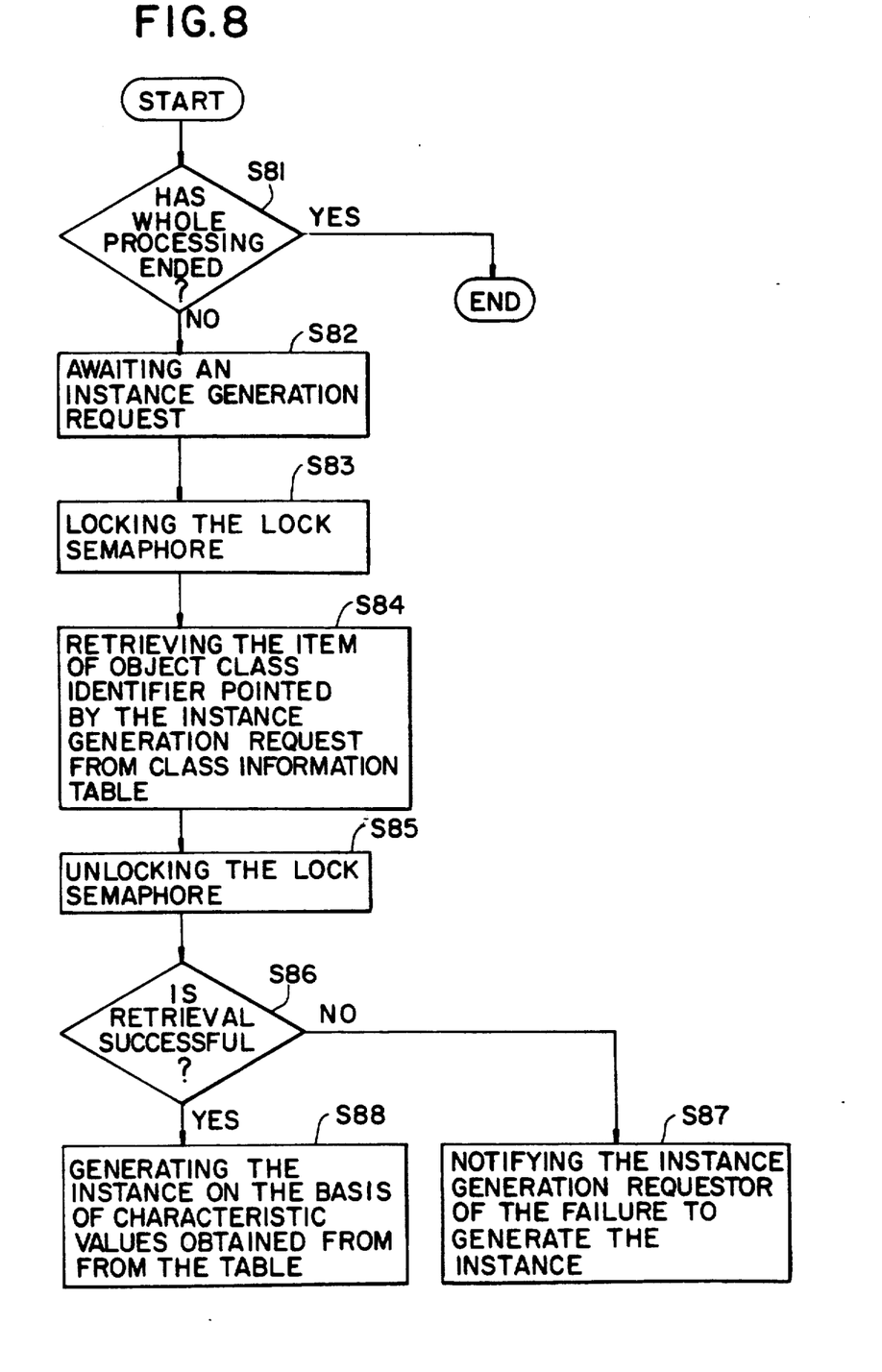
FIG. 8 is a flow chart for describing the operation of the instance generating means 3 shown in FIG. 1.

Referring now to FIGS. 1 and 8, the instance generating means 3 is in a state awaiting an instance generation request at step S82. In response to the acceptance of an instance generation request, the generating means 3 refers to the class information table 9 to obtain the class definition information of the instance to be generated. Before this reference, the generating means 3 at step 83 locks the lock semaphore 6, performs exclusive control against the class information table generating/updating means 2 and, after referring to the class information table 9 at the step S84, unlocks the lock semaphore 6 at step S85. The instance generating means 3 judges whether the object class identifier pertaining to the instance generation request was present in the table 9 or not according to the result of reference to the table 9 (step S86). In response to a judgement that the object class identifier was absent in the table 9, the generating means 3 notifies the instance generation requestor of the failure to generate the instance (step S87) and, after judging whether or not the whole processing has ended (step S81), returns to the instance generation request awaiting state if it has not ended (step S82).

Alternatively, the generating means 3, in response to the judgement at step S86 that the object class identifier was present in the table 9, generates the instance on the basis of characteristic values obtained from the table 9 (step S86) and, after judging whether or not the whole processing has ended (step S81), returns to the instance generation request awaiting state if it has not ended (step S82).

Referring back to FIG. 1, the lock semaphore access means 4 performs control to lock or unlock the lock semaphore 6 in response to a request from the class information table generating/updating means 2 or the instance generating means 3, and thereby achieves exclusive control of the reference to or the updating of the class information table 9.

As hitherto described, according to the present invention, the complex processing to find out inherited characteristics, as shown in FIG. 7, is accomplished by batch processing of only the generation of the updating class information table 10 by the inheritance tree updating means 1 and the class information table generating/updating means 2, and the updating of the class information table 9 is carried out by temporary exclusive control by the lock semaphore access means 4, as shown in FIG. 6, with only the information obtained in a table form. Therefore, even the instance generating means 3, which requires real-time processing, needs only temporary exclusive control by the lock semaphore access means 4, as shown in FIG. 8, to find out the characteristics of the designated object class identifier in the latest updated information of the object class definition 5 in a table form.

The present invention thus makes it possible to perform exclusive control by locking the lock semaphore 6 against the information table of the object class defined in an object-oriented model, refer to this information table on a real-time basis, and thereby update the information table with information from the object inheritance tree generated by batch processing without having to interrupt the processing of instance generation.

As a result, the invention provides the benefits of enabling object class definitions to be altered during the operation of network management, and to respond to a request for real-time instance generation.

What is claimed is:

1. A computerized installing system for installing object class defining information in a network management system, said computerized installing system comprising:
   a first storage region for storing a plurality of object class definitions;
   a second storage region for storing instances of a class for which generation is requested;
   a third storage region for storing an updating class information table;
   batch processing means for generating/updating contents of said third storage region by batch processing by using contents of said first storage region;
   real time processing means for generating/updating contents of said second storage region by using contents of said third storage region, said real time processing means including
   a fifth storage region for storing a class information table, said class information table including characteristics of a particular class including characteristics inherited by said particular class and
   instance generating means for generating/updating contents of said second storage region by using contents of said fifth storage region; and
   class information table generating/updating means for generating/updating said updating class information table stored in said third storage region and for generating/updating said class information table stored in said fifth storage region;
   said real time processing means further including
   a lock semaphore for performing exclusive control for avoiding contention relative to said fifth storage region between said class information table generating/updating means, when generating/updating said class information table stored in said fifth storage region, and said instance generating means, when generating/updating contents of said second storage region by using contents of said fifth storage region, respectively, and
   lock semaphore access means, actuated by said class information table generating/updating means and by said instance generating means, for accessing said lock semaphore.

2. The system of claim 1, wherein said object class definitions stored in said first storage region pertain to objects of management operated according to OSI management protocols.

3. The system of claim 1, wherein characteristics of a class stored in said class information table include characteristics inherited in said class.

4. The system of claim 1, wherein said batch processing means includes,
   a fourth storage region for storing an object inheritance tree,
   inheritance tree generating/updating means for generating/updating contents of said fourth storage region by using contents of said first storage region, and
   a portion of said class information table generating/updating means as third storage region generating/updating means for generating/updating contents of said third storage region on the basis of contents of said fourth storage region.

5. The system of claim 4, wherein said real time processing means includes:
   a portion of said class information table generating/updating means as fifth storage region generating/updating means for generating/updating contents of said fifth storage region on the basis of contents of said third storage region.

6. The system of claim 5, wherein said lock semaphore access means for accessing said lock semaphore is actuated by one of said fifth storage region generating/updating means and said instance generating means.

7. The system of claim 6, wherein said class information table generating/updating means locks said semaphore from said class information table, refers to said class information table on a real time basis and updates said class information table with information from said object inheritance tree without interrupting processing of instance generation.

* * * * *